July 16, 1935.  F. E. DENNISON ET AL  2,008,580
SEALED JOINT
Filed April 8, 1933
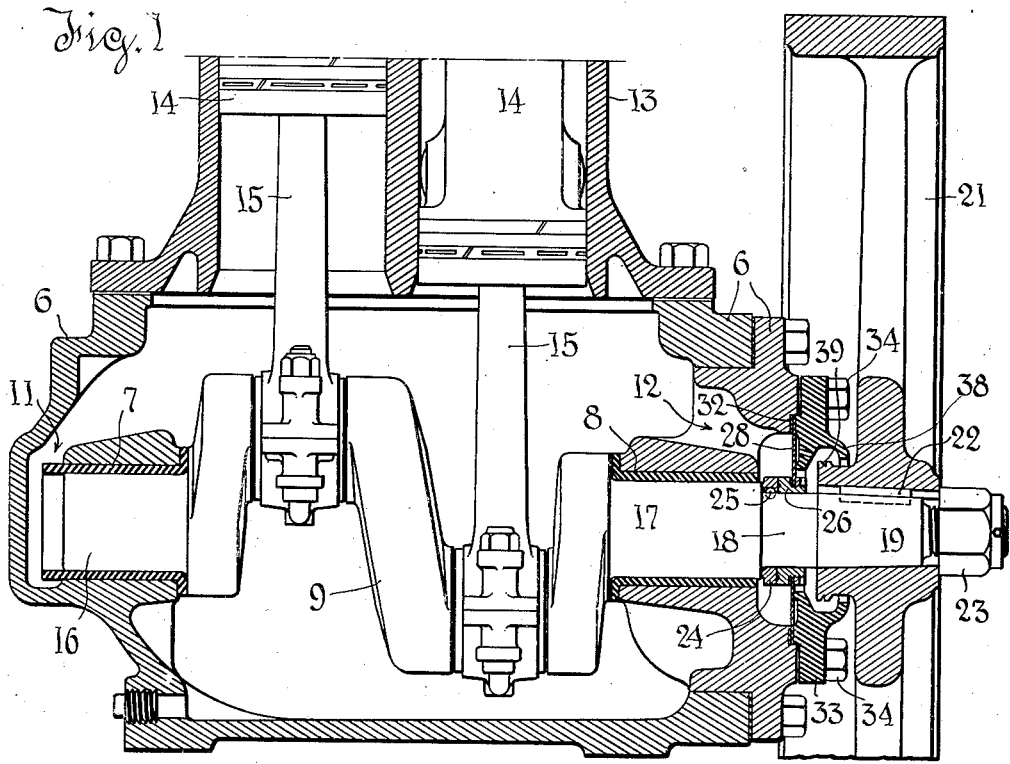
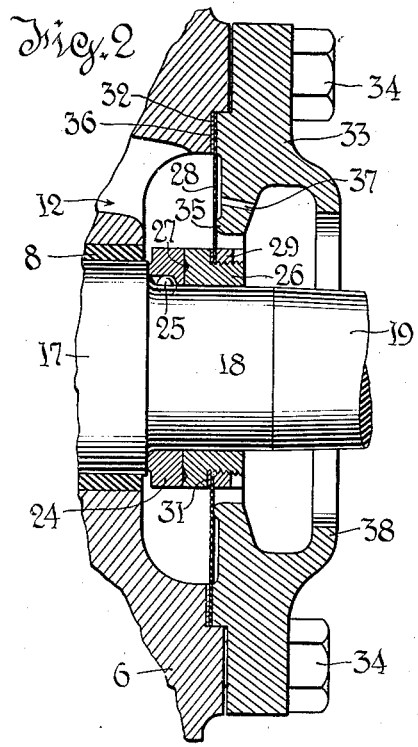
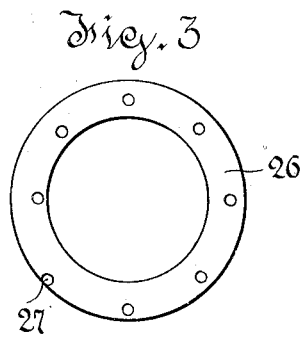
Inventors
French E. Dennison
William D. Leonard
Attorneys Patented July 16, 1935

2,008,580

UNITED STATES PATENT OFFICE 2,008,580

SEALED JOINT

French E. Dennison and William D. Leonard, York, Pa., assignors to York Ice Machinery Corporation, York, Pa., a corporation of Delaware Application April 8, 1933, Serial No. 665,207

19 Claims. (Cl. 286—11)

This invention relates to what are commonly called "packed" joints, and particularly to sealed joints of the so-called diaphragm type.

The invention will be described as applied to a reciprocating compressor of the single-acting type, that being the field in which sealed joints of the diaphragm type have so far attained their greatest use, but the invention is generally applicable and the controlling considerations underlying its use will be set out more fully hereinafter.

Where small compressors are used as components in refrigerating systems, the crank case of the compressor is commonly at or substantially at the suction pressure in the refrigerating circuit. This is advantageous from the point of view that suction pressure is the low pressure in the refrigerant circuit so that the tendency toward leakage around the shaft is minimized. A serious disadvantage, however, arises from the fact that with commercial refrigerants now in common use, and particularly where control is effected by intermittent operation of the compressor, the suction pressure in the system may at times be below atmospheric pressure and at other times above atmospheric pressure. In some systems, adjustments designed to vary the temperature maintained by the refrigerating circuit involve changes in suction pressure with like effect.

In diaphragm seals as heretofore constructed, such reversal of the pressure differential acting on the joint would create an abnormal condition under which fluid pressure acting on the diaphragm functioned to reduce the sealing pressure on the sealing ring, so that a loading spring or springs were commonly used to maintain sealing pressure when a reversible differential was to be encountered. The use of such a loading spring to meet the abnormal condition just mentioned, results in unduly high sealing pressure under normal conditions.

According to the present invention, a single diaphragm carries a sealing ring which mates with a relatively rotatable companion sealing ring. An annular fulcrum engages the diaphragm and is so positioned as to produce a slight initial flexure of the diaphragm, which develops the sealing pressure on the rings by the inherent elasticity of the diaphragm itself. This is the normal sealing pressure on the rings and is preferably such as to be adequate for all conditions of service.

Assuming that the fluid pressure differential acting on the diaphragm is reversible, as above suggested, when this differential urges the diaphragm away from the fulcrum, the whole area of the diaphragm is subject to pressure in a sealing direction, but until the fluid pressure differential moves the diaphragm clear of the fulcrum (which is not contemplated), the total sealing pressure on the two rings is not materially increased because the flexing stress on the diaphragm is merely transferred from the fulcrum to the fluid pressure differential.

When the pressure differential is reversed so that the diaphragm is forced toward the annular fulcrum, the fulcrum divides the diaphragm into two annular areas which develop opposing forces affecting the sealing pressure between the rings. The ideal condition would be such that the pressure acting on these two areas causes them substantially to counter-balance each other, in which event the sealing pressure on the rings would remain unchanged. This condition may be described by saying that the effective areas are approximately equal, even though in practice the actual areas differ markedly. However, in order to safeguard the maintenance of the seal, it is considered better that fluid pressure acting on the diaphragm at that side of the fulcrum remote from the ring, shall predominate slightly, so that the sealing pressure on the rings will be increased rather than diminished.

The effect is to produce a single diaphragm seal in which the sealing pressure is approximately that developed by flexure of the diaphragm in the assembling of the device, and is substantially independent of fluid pressure. However, such effect as is exercised by fluid pressure, regardless of the direction in which the pressure differential acts, is favorable to the maintenance of the seal.

Before proceeding with the detailed description, it should be clearly understood that the invention is not limited to use between rotary parts, but the broad principle is applicable where the motion is not strictly rotary. Relative motion between the parts is contemplated, and it is immaterial whether both or only one of the relatively movable parts is in motion. In the example chosen for illustration, the diaphragm is fixed on the outer of two concentric and relatively rotatable parts. This arrangement is obviously subject to reversal. Moreover, since the joint is sealed regardless of the direction in which the fluid pressure differential acts, the structure is obviously reversible in this sense also.

In the drawing:—

Fig. 1 is a view showing the invention applied to a two-cylinder compressor, the view being a vertical axial section through the crank case and a portion of the two cylinders;

Fig. 2 is an enlarged fragmentary view of the sealed joint shown in Fig. 1; and

Fig. 3 is a face view of the sealing ring showing the recesses used for the distribution of lubricant.

Referring first to Fig. 1, the crank case is shown at 6, and is provided with a rear bearing 7 and a front bearing 8 for a double-throw crank shaft 9. It will be observed that the crank case is formed with passages 11 and 12 intended to convey oil splashed by the crank shaft 9 to the forward and rear bearing and to the sealing ring hereafter described as associated with the forward bearing.

The cylinder block 13 contains two cylinders in which work pistons 14 of conventional form, the pistons being reciprocated by connecting rods 15 associated with corresponding crank throws. The crank shaft 9 is provided with a rear journal 16 which turns in the rear bearing 7 and with a front journal 17 which turns in the front bearing 8. The rear end of the crank shaft is enclosed within the crank case, while the forward end projects outside the crank case. Consequently, the differential pressure between the crank case and atmosphere acting on the cross sectional area of the shaft where it passes through the seal will develop a force acting upon the shaft in an axial direction moving it inward (to the left) when atmospheric pressure predominates, or outward (to the right) when crank case pressure predominates. The shaft is purposely given a very slight axial play between the bearings 7 and 8.

The shaft has a reduced portion 18 where it passes through the sealing structure hereinafter described, and beyond this is tapered as indicated at 19 to receive the combined fly and belt wheel 21 through which it is driven. The wheel is retained by a key 22 and castellated nut 23, the nut being threaded on the extreme end of the shaft. The parts so far described conform in a general way to known construction and no novelty for this construction is here claimed, the present case being devoted to the joint packing.

Encircling the reduced portion 18 of the crank shaft and seated against the shoulder between the journal 17 and the reduced portion 18 is a sealing ring 24 which is constrained to turn with the shaft by a ball key 25 seated in a pocket in the portion 18 of the shaft and in a slot cut in the ring 24 from the inner (left hand) face thereof. The reason for constructing the ring 24 as a unit separate from the shaft is that its outer (right hand) sealing face can be finished with greater precision than it is possible to finish a shoulder formed integrally with the shaft. Furthermore, the ring 24 may be made of especially selected material not necessarily suitable for use as a crank shaft and may be individually heat treated. In the preferred construction it is hardened and polished steel. The practice is to lap the ring 24 on the portion 18 of the shaft and against the shoulder so that a gas-tight joint is secured between the ring and the shaft.

Axially slidable on the portion 18 of the shaft is a sealing ring 26 whose inner face is in thrust relation with the outer face of the ring 24. Ring 26 is relatively soft. Engagement of these two faces produces the sealed joint. In order to insure the presence of lubricant between the two faces, the ring 26 is provided with a spirally arranged series of shallow recesses 27, the outermost of which intersects the outer periphery of the ring, so that it will pick up oil entering through the passage 12. The orbits of the successive recesses overlap each other so that in effect they pass oil from one to the next until all of the recesses are provided with oil and film is thus maintained between the contacting surfaces of the rings 24 and 26.

Locked to the ring 26 is an encircling resilient diaphragm 28. This diaphragm is preferably constructed of spring steel suitably heat treated. It is clamped in place by a nut 29 threaded upon a reduced portion of the ring 26 and acting to force the diaphragm 28 against the shoulder formed on the ring.

In order to permit the adjustment of the position of the diaphragm 28 relatively to the inner face of the ring 26, interchangeable shims 31 are used. The introduction of thicker and thicker shims permits compensation for progressive wear of the rings. The outer periphery of the diaphragm 28 is rigidly clamped against an annular seat 32 formed in the crank case 6 by means of an overlying cover plate 33 held in place by studs and nuts indicated at 34. The cover plate 33 is provided with an annular bead or fulcrum 35 which engages the outer side of the diaphragm 28 somewhat nearer the ring 26 than the seat 32 and produces a slight initial flexure of the diaphragm 28 sufficient to develop a suitable sealing pressure between the ring 26 and the ring 24 when the pressure differential acting on the diaphragm 28 is zero.

For adjusting purposes, interchangeable shims 36 are interposed between the periphery of the diaphragm and the seat 32. As ordinarily constructed, the rib or bead 35 which serves as a fulcrum is not very precisely finished and consequently permits atmospheric pressure to act over the entire outer face of the diaphragm 28 at all times.

In order to make clear in the drawing that the surface of the diaphragm outside the bead 35 is subject to atmospheric pressure, a port 37 is indicated in the drawing, and may be used, though its use is not strictly essential to the attainment of the desired result. The inwardly projecting flange 38 is used in conjunction with the drip flanges 39 on the fly wheel to catch any oil which might seep through the joint, and suitable connections (not shown) may be provided to drain away any oil so intercepted. The use of such means is familiar and is not a part of the present invention.

When there is no differential of pressure between the crank case and atmosphere, the bead 35 entails a slight flexure of the diaphragm 28 and the diaphragm, being elastic, develops the normal sealing pressure necessary to prevent leakage.

When atmospheric pressure predominates over crank case pressure, the crank shaft 9 is urged inward (to the left) by the predominant atmospheric pressure. Under such conditions, the flexure of the diaphragm by the annular fulcrum, is slightly reduced but the sealing pressure between the rings 26 and 24 is maintained or even increased by the fluid pressure differential which acts on the entire area of the diaphragm 28.

When crank case pressure predominates over atmospheric pressure, the shaft 9 moves slightly outward. This motion ensures a slight increase in the flexure of the diaphragm 28 over the fulcrum bead 35. The actual area of the diaphragm 28 exposed to predominating internal pressure outside bead 35 is larger both radially and circumferentially than, and hence substantially exceeds, the actual area within the bead 35, so that the outward flexure of the diaphragm 28 outside of bead 35 deforms the diaphragm sufficiently to urge the inner circumference of the diaphragm and consequently the shiftable ring 26 inward (to the left).

The disparity between the actual diaphragm areas outside and inside the fulcrum exceeds the disparity of the opposing forces developed. This results from the fact that the outer margin is clamped rigidly and the outer portion of the diaphragm has only very small capability of motion.

In the claims the term "effective area" will be used to define the area in terms of the force developed. Two annular areas of a diaphragm approximately equal in effective area (i. e. equal in force developing property) may differ markedly in actual area.

In certain of the claims the rib or bead 35 is described as affording an "annular" fulcrum. The term "annular" as applied to the bead or fulcrum in the claims is not intended to imply the necessary use of a continuous or closed ring as a fulcrum. It is sufficient if the fulcrum bead or its equivalent be such as to entail substantially even annular flexure of the diaphragm. A continuous ring, however, is preferred for this purpose as the simplest arrangement, and certain claims will be specifically limited thereto by the use of the word "continuous", or an equivalent.

The principle of using a single diaphragm subject to reversible differential pressure in conjunction with a fulcrum to develop uni-directional sealing pressure in a sealed joint, is believed to be broadly new and to be available for use in a wide range of devices. Consequently, no limitations to the specific structure disclosed are implied, the scope of the invention being defined in the claims.

What is claimed is,—

1. In a sealed joint of the diaphragm type for separating pressure fluids, at least one of which is subject to variable pressure, the combination of a pair of relatively movable members; a pair of sealing elements in slidable face engagement with each other, one of said elements being carried by and in fluid tight relation with one of said members; a substantially flat elastic diaphragm forming a supporting fluid tight connection between the other of said elements and the other of said members, said diaphragm being subject on its opposite faces to the separated pressure fluids; and a fixed fulcrum engaging said diaphragm along a line intermediate its support and the supported sealing element and flexing the diaphragm to develop a seal producing stress therein, said fulcrum dividing said diaphragm into two flexible areas upon which a fluid pressure differential acting toward the fulcrum develops approximately balanced opposing forces.

2. In a sealed joint of the diaphragm type for separating pressure fluids, at least one of which is subject to variable pressure, the combination of a pair of relatively movable members; a pair of sealing elements in slidable face engagement with each other, one of said elements being carried by and in fluid tight relation with one of said members; a substantially flat elastic diaphragm forming a supporting fluid tight connection between the other of said elements and the other of said members, said diaphragm being subject on its opposite faces to the separated pressure fluids; and a fixed fulcrum engaging said diaphragm along a line intermediate its support and the supported sealing element and flexing the diaphragm to develop a seal producing stress therein, said fulcrum dividing said diaphragm into two slightly unequal effective areas the smaller of which is adjacent said supported sealing element.

3. In a sealed joint of the diaphragm type for separating pressure fluids, at least one of which is subject to variable pressure, the combination of a pair of relatively movable members; a pair of sealing elements in slidable face engagement with each other, one of said elements being carried by and in fluid tight relation with one of said members; a substantially flat elastic diaphragm forming a supporting fluid tight connection between the other of said elements and the other of said members, said diaphragm being subject on its opposite faces to the separated pressure fluids; a fixed fulcrum engaging said diaphragm along a line intermediate its support and the supported sealing element and flexing the diaphragm to develop a seal producing stress therein, said fulcrum dividing said diaphragm into two flexible areas upon which a fluid pressure differential acting toward the fulcrum develops approximately balanced opposing forces; and means for adjusting the parts in a direction normal to the plane of face engagement of the sealing elements to adjust the sealing pressure produced by flexure of the diaphragm.

4. In a sealed joint, the combination of two relatively rotatable members, one of which has a sealing surface; a substantially flat elastic annular diaphragm, subject on opposite sides to the fluid pressures on opposite sides of the sealed joint, the diaphragm having one circumference mounted on the other of said members, and its other circumference provided with a sealing surface coacting with the first-named sealing surface; and means providing an annular fulcrum reacting upon said diaphragm between its inner and outer circumferences to urge said sealing surfaces together, the diaphragm being divided by such fulcrum into two concentric flexible portions upon which a fluid pressure differential acting toward the fulcrum develops approximately equal effective forces.

5. In a sealed joint, the combination of two relatively rotatable members, one of which has an annular sealing surface; an axially movable sealing ring coacting therewith; a substantially flat elastic annular diaphragm, subject on opposite sides to the fluid pressures on opposite sides of the sealed joint, the diaphragm having one circumference mounted on the second of said members, and the other circumference connected with said sealing ring; and means providing an annular fulcrum engaging said diaphragm intermediate its inner and outer circumferences, reacting upon the diaphragm to urge said sealing ring against the first-named sealing surface, said fulcrum dividing said diaphragm into two concentric flexible portions upon which a fluid pressure differential acting toward the fulcrum develops slightly different effective forces, the effective force developed on the annular portion remote from the sealing ring slightly exceeding the effective force developed on the annular portion adjacent the sealing ring.

6. In a sealed joint, the combination of two relatively rotatable members, one of which has an annular sealing surface; an axially movable sealing ring coacting therewith; a substantially flat elastic annular diaphragm, subject on opposite sides to the fluid pressures on opposite sides of the sealed joint, the diaphragm having one circumference mounted on the second of said members, and the other circumference connected with said sealing ring; means providing an annular fulcrum engaging said diaphragm intermediate its inner and outer circumferences, reacting upon the diaphragm to urge said sealing ring against the first-named sealing surface said fulcrum dividing said diaphragm into two flexible annular portions upon which a fluid pressure differential acting toward the fulcrum develops approximately equal effective forces; and means for producing a relative adjustment between the first sealing surface, on the one hand, and the fulcrum means and the first-named circumference of the diaphragm on the other hand.

7. The combination of a crank case having a bearing and an opening concentric with said bearing and formed with an annular seat; a shaft rotatably mounted in said bearing and having a shoulder provided with a sealing face; a sealing ring encircling said shaft and adapted to seal against said face; an annular diaphragm subject on its opposite sides to atmospheric pressure and pressure in said crank case, said diaphragm being connected with said ring and having a marginal portion seated in the annular seat in the crank case; and a member adapted to clamp the peripheral portion of said diaphragm against said seat, said member encircling the shaft and being provided with a bead also encircling the shaft and having an annular contact with the diaphragm adjacent the ring, said bead serving to deflect the diaphragm, and the ring carried thereby, toward said sealing shoulder, and serving to divide said diaphragm into two annular portions upon which a fluid pressure differential acting toward the bead develops approximately equal effective forces.

8. A sealed joint, comprising two relatively rotatable sealing rings; and a flexible pressure-actuated diaphragm upon which one of said rings is mounted, the sealing face of one of said rings being provided with a series of shallow oil-retaining pockets arranged in a spiral with their orbits overlapping, and at least one of said pockets at the extremity of the spiral series having an opening external to the sealing face of the ring in which it is formed, such opening serving for the entrance of lubricant.

9. In a sealed joint, the combination of a flexible diaphragm subject to a reversible fluid pressure differential; joint sealing means comprising two relatively rotatable sealing rings in sealing engagement with each other, one of said rings being axially movable and supported by said diaphragm; and means for converting said reversible differential into a unidirectional force exerted by said diaphragm upon said rings, said means comprising a fulcrum rendered alternately effective and ineffective to subdivide the diaphragm into opposed force developing areas by the reversal of such differential.

10. In a sealed joint, the combination of a flexible diaphragm subject to a reversible fluid pressure differential; joint sealing means comprising two relatively rotatable sealing rings in sealing engagement with each other, one of said rings being axially movable and supported by said diaphragm; and means comprising an annular fulcrum engaging said diaphragm adjacent said ring and reacting thereupon in a direction to produce engagement of the diaphragm carried ring with the other ring, said fulcrum being rendered alternately effective and ineffective to subdivide the diaphragm into opposing force developing areas by the reversal of such differential.

11. The combination with a sealed joint of the diaphragm type subject to a reversible fluid pressure differential, said joint including a diaphragm subject on its opposite sides to the fluid pressures on opposite sides of the joint and a sealing element carried by said diaphragm; of a secondary support coacting with a normally movable portion of the diaphragm and serving to reverse the motion of the ring-carrying portion of the diaphragm when the diaphragm is distorted by pressure differential acting in one direction without imposing such reversal of motion when the diaphragm is distorted by pressure differential acting in the reverse direction.

12. In a sealed joint, the combination of two relatively rotatable members, the first of which has a sealing surface; a substantially flat elastic annular diaphragm subject on opposite sides to the fluid pressures on opposite sides of the sealed joint, the diaphragm having one circumference mounted on the second of said members and its other circumference provided with a sealing surface coacting with the sealing surface on the first member, said first member being exposed at its opposite ends to the fluid pressures on opposite sides of said joint and shiftable axially in reverse directions by reversal of the differential between said pressures; means providing an annular fulcrum reacting upon said diaphragm between its inner and outer circumferences to urge the sealing surface on the diaphragm against that on the first member, the diaphragm being divided by such fulcrum into two concentric flexible portions upon which a fluid pressure differential acting toward the fulcrum develops approximately equal effective forces; and means for limiting the axial movement of said first member to a range in which the change of sealing force produced by change of flexure of the diaphragm approximately compensates for changes in effective sealing force produced by changes of fluid pressure differential.

13. The combination with a crank case having a bearing and an opening concentric with said bearing and formed with an annular seat; a shaft rotatably mounted in said bearing and having a shoulder provided with a sealing face, said shaft being exposed at one end to the pressure in said crank case and at the opposite end to atmospheric pressure and being capable of movement in the direction of its axis; a sealing ring encircling said shaft and adapted to seal against said face; an annular diaphragm subject on its opposite sides to atmospheric pressure and pressure in said crank case, said diaphragm being connected with said ring and having a marginal portion seated in the annular seat in the crank case; a member adapted to clamp the peripheral portion of the diaphragm against said seat said member encircling the shaft and being provided with a bead also encircling the shaft and having an annular contact with the diaphragm adjacent the ring, said bead serving to deflect the diaphragm and the ring carried thereby toward said sealing shoulder and serving to divide said diaphragm into two annular portions upon which a fluid pressure differential acting toward the bead develops approximately equal effective forces; and means for limiting the axial movement of said shaft to a range in which the change of sealing force produced by change of flexure of the diaphragm approximately compensates for changes in effective sealing force produced by changes in the fluid pressure differential.

14. In a sealed joint, the combination of a flexible diaphragm subject to a reversible fluid pressure differential; joint sealing means comprising two relatively rotatable sealing rings in sealing engagement with each other, both of said rings being axially movable and the first thereof being supported by said diaphragm; means for converting said reversible differential into a uni-directional force exerted by said diaphragm upon said rings, said means comprising a fulcrum rendered alternately effective and ineffective to subdivide the diaphragm into opposed force developing areas by the reversal of such differential, said fulcrum deflecting the diaphragm and thereby stressing the same; and means for limiting the axial motion of the second sealing ring to a range in which the change of sealing force produced by change of flexure of the diaphragm by the fulcrum approximately compensates for changes in effective sealing force produced by changes of fluid pressure differential.

15. The combination of claim 4, in which the means providing an annular fulcrum takes the form of a continuous annular bead.

16. The combination defined in claim 10, in which the means comprising the annular fulcrum takes the form of a continuous annular bead.

17. The combination defined in claim 11, in which the secondary support is in the form of a circular rib which divides the diaphragm into two unequal concentric areas and produces compound flexure of the diaphragm when the pressure differential acts in said first-named direction, and permits the diaphragm to flex normally when the pressure differential acts in the opposite direction.

18. In a sealed joint for interposition between two movable members to separate pressure fluids subject to pressure variations which produce reversals of fluid pressure differential on the joint; the combination of two sealing elements in slidable face engagement to produce the seal, one of said elements being carried by and in fluid tight relation with one of said members and shiftable therewith reversely in a path normal to the plane of face engagement by such reversals of fluid pressure differential; means for limiting such shifting to a narrow range; an annular diaphragm fixedly mounted and sealed at one periphery to the other member and carrying at its other periphery the second of said sealing elements, said diaphragm being subject on opposite faces to the separated pressure fluids; and an annular fulcrum engaging said diaphragm and flexing the same to develop a sealing force between said elements throughout the permitted range of motion of the first element, said fulcrum dividing said diaphragm into two annular flexible areas upon which a fluid pressure differential acting toward the fulcrum develops approximately equal effective forces.

19. In a sealed joint for interposition between two movable members to separate pressure fluids subject to pressure variations which produce reversals of fluid pressure differential on the joint; the combination of two sealing elements in slidable face engagement to produce the seal, one of said elements being carried by and in fluid tight relation with one of said members and shiftable therewith reversely in a path normal to the plane of face engagement by such reversals of fluid pressure differential; means for limiting such shifting to a narrow range; an annular diaphragm fixedly mounted and sealed at one periphery to the other member and carrying at its other periphery the second of said sealing elements, said diaphragm being subject on opposite faces to the separated pressure fluids; and an annular fulcrum engaging said diaphragm and flexing the same to develop a sealing force between said elements throughout the permitted range of motion of the first element, said fulcrum dividing said diaphragm into two annular flexible areas upon which a fluid pressure differential acting toward the fulcrum develops approximately equal effective forces, the effective force on the area remote from the sealing element being not less than the effective force on the area adjacent the sealing area.

FRENCH E. DENNISON.
WILLIAM D. LEONARD.